US 11,725,701 B1

(12) United States Patent
Goodwill

(10) Patent No.: US 11,725,701 B1
(45) Date of Patent: Aug. 15, 2023

(54) DISCONNECT CLUTCH ASSEMBLY SHAFT WITH CAP

(71) Applicant: Schaeffler Technologies AG & Co. KG, Herzogenaurach (DE)

(72) Inventor: Edward Goodwill, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/993,005

(22) Filed: Nov. 23, 2022

(51) Int. Cl.
*F16H 25/06* (2006.01)
*F16D 25/0638* (2006.01)
*F16D 13/52* (2006.01)

(52) U.S. Cl.
CPC .......... *F16D 25/0638* (2013.01); *F16D 13/52* (2013.01)

(58) Field of Classification Search
CPC ...... F16D 25/0638; F16D 13/52; F16D 13/70; F16D 2125/06
See application file for complete search history.

(56) References Cited

U.S. PATENT DOCUMENTS

| 4,355,710 A * | 10/1982 | Schilling ............. F16D 25/0635 192/82 T |
| 11,111,970 B1* | 9/2021 | Wurst ................. F16D 25/0638 |
| 2020/0248758 A1* | 8/2020 | Satyaseelan ............ F16D 25/10 |
| 2020/0292012 A1* | 9/2020 | Koon ....................... F16D 25/12 |
| 2021/0148416 A1* | 5/2021 | Nakashima ........... F16F 15/123 |
| 2022/0055471 A1* | 2/2022 | Ideue .................. F16D 25/0638 |
| 2022/0154784 A1* | 5/2022 | Tysman ................ F16D 25/123 |

OTHER PUBLICATIONS

Unpublished U.S. Appl. No. 17/479,038, filed Sep. 20, 2021 Country: United States Author: Schaeffler Technologies AG and Co. KG.

* cited by examiner

*Primary Examiner* — Stacey A Fluhart

(57) ABSTRACT

A clutch assembly includes a shaft, a seal plate supported by the shaft, and a cap connect to the shaft. The shaft includes a first end and a second end axially spaced from each other. The cap is disposed at the second end. The cap includes a base covering the second end, and a wall extending from the base towards the first end. The wall is configured to axially constrain the seal plate.

20 Claims, 2 Drawing Sheets

DISCONNECT CLUTCH ASSEMBLY SHAFT WITH CAP

TECHNICAL FIELD

The present disclosure relates generally to a disconnect clutch assembly, and more specifically to a cap for a shaft of the disconnect clutch assembly.

BACKGROUND

Disconnect clutches are generally known. In some arrangements, a disconnect clutch assembly may include a shaft having an axial channel extending through a distal end of the shaft. In such arrangements, the shaft may include a sealing ball inserted into the axial channel. Further, the disconnect clutch assembly may include a snap ring configured to retain a sealing cover. It is desirable to have alternative designs and configurations to reduce complexity of the disconnect clutch assembly while still meeting durability and performance requirements.

SUMMARY

Embodiments disclosed herein provide a clutch assembly including: a shaft; a seal plate; and a cap. The shaft has a first end and a second end axially spaced from each other. The seal plate is supported by the shaft. The cap is connected to the shaft and disposed at the second end. The cap includes a base covering the second end. The cap further includes a wall extending from the base towards the first end. The wall is configured to axially constrain the seal plate In embodiments, the wall may extend annularly about the shaft. The wall may contact the seal plate about the shaft. In embodiments, the wall may prevent movement of the seal plate towards the second end. In embodiments, the wall may contact an outer diameter of the shaft. The wall may be connected to the shaft via a press-fit connection. In embodiments, the second end of the shaft may contact the base.

In embodiments, the shaft may include a channel extending axially through the second end. The cap may close the channel at the second end. The cap may include a plug disposed in the channel. The plug may be configured to seal the channel. The plug may be configured to prevent a flow of fluid out of the second end of the shaft. The plug may be connected to the channel via a press-fit connection. The clutch assembly may include a seal configured to seal the seal plate to the shaft. The seal may be disposed axially between the plug and the first end. The plug may be radially spaced from the wall. The plug may be disposed radially inside of the wall. A portion of the shaft may be radially compressed between the plug and the wall. The channel may be spaced from the first end.

In embodiments, the seal plate may be disposed closer to the second end than to the first end. In embodiments, the clutch assembly may include a seal configured to seal the seal plate to the shaft. The wall may contact the seal plate axially between the seal and the second end. In embodiments, the clutch assembly may include a piston axially slidable along the shaft and sealed to the seal plate. The seal plate may be disposed axially between the piston and the cap. In embodiments, the cap is formed of steel.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
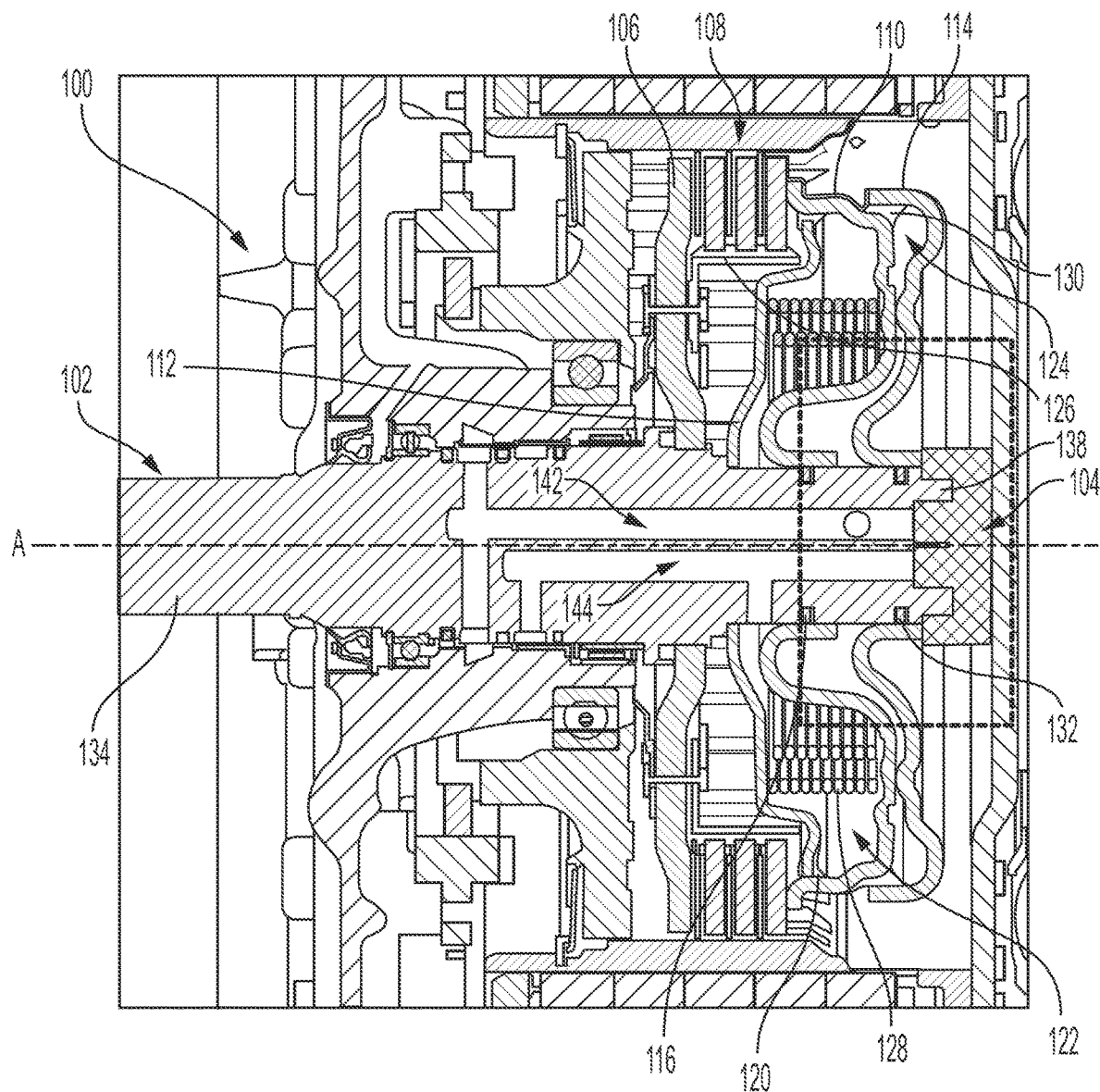
FIG. 1 illustrates a detail cross-sectional view of a disconnect clutch assembly according to an embodiment of the present disclosure.
Figure 2:
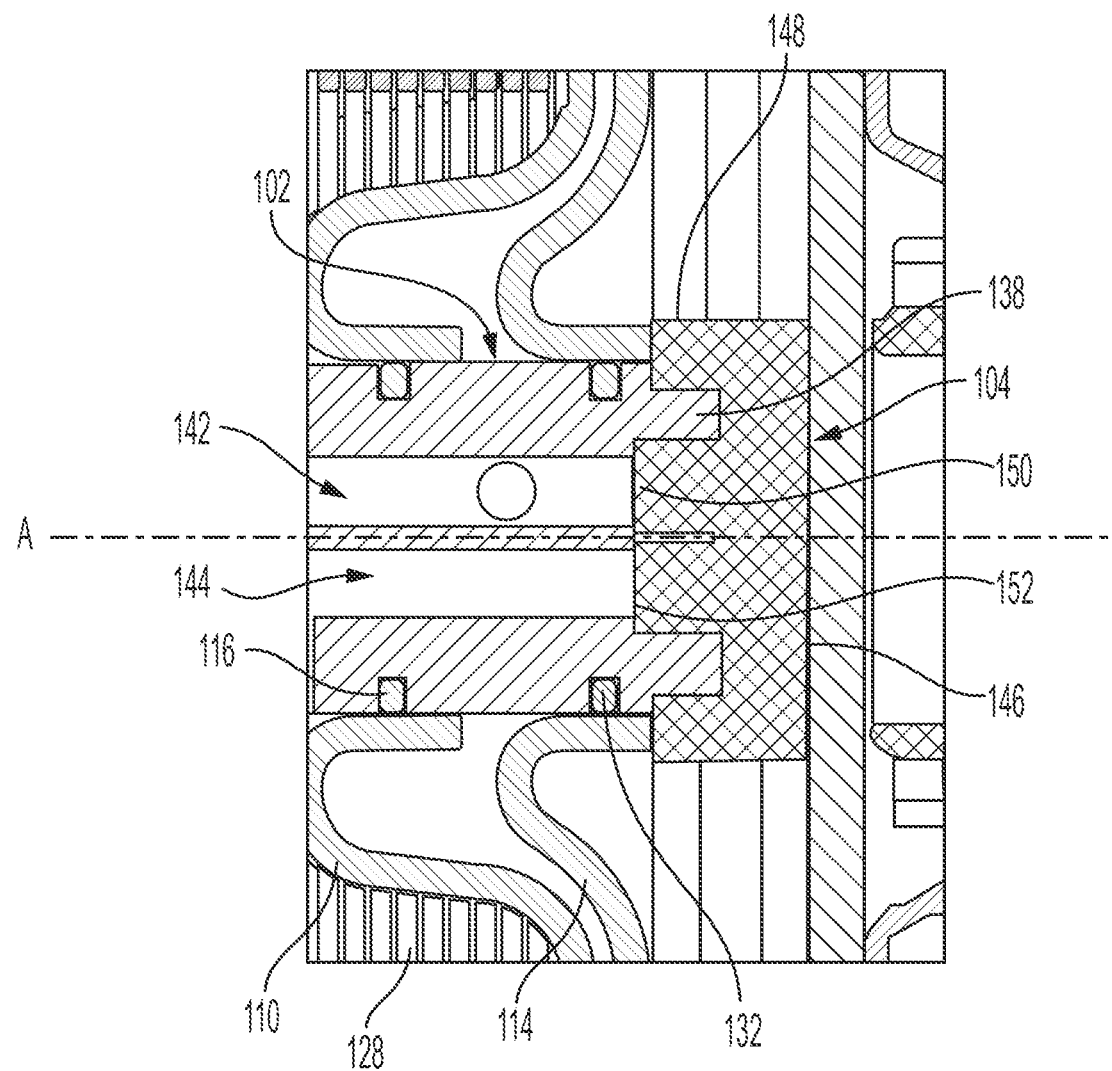
FIG. 2 illustrates cross-sectional view of an enlarged area of the disconnect clutch assembly shown in FIG. 1.

Referring to FIG. 1-2, a disconnect clutch assembly 100 is illustrated according to one exemplary embodiment of the present disclosure. The disconnect clutch assembly 100 is rotatable about a central axis A. Words such as "axial," "radial," "circumferential," "outward," etc. as used herein are intended to be with respect to the central axis A.

The disconnect clutch assembly 100 includes: a shaft 102, a cap 104, a backing plate 106, clutch plates 108, a piston 110, a balance dam 112, and a seal plate 114. The backing plate 106 is fixed to the shaft 102, e.g., by staking. The piston 110 is sealed to the shaft 102, e.g., by a seal 116, and is axially slidable on the shaft 102 to clamp the clutch plates 108 against the backing plate 106 to close the disconnect clutch assembly 106. The balance dam 112 is fixed to the shaft 102, e.g., by staking, and is disposed axially between the backing plate 106 and the piston 110. The balance dam 112 is sealed to the shaft 102, e.g., at the staking. The balance dam 112 may include a cooling flow orifice (not shown) for permitting cooling flow through the balance dam 112 to cool the clutch plates 108.

The piston 110 and the balance dam 112 are sealed together at a bonded seal 120 to form a portion of a balance chamber 122. The balance chamber 122 is further defined by, or bounded between, the shaft 102, the balance dam 112, the bonded seal 120, the piston 110, and the seal 116. By "bounded in part," we mean that a portion of the cited chamber, flow path, or other structure is bounded, or formed, by the cited element.

The shaft 102 may include a radial channel (not numbered) for introducing a fluid into the balance chamber 122.

The radial channel may be configured to introduce the cooling flow into the balance chamber 122 to hydraulically balance the piston 110 and provide the cooling flow for the clutch plates 108. By hydraulically balancing the piston 110, we mean that balance chamber 122 and a pressure chamber 124 disposed on opposite sides of piston 110 are both filled with fluid, e.g., oil, so that any dynamic pressure effects from rotation of the piston 110, the balance dam 112, the shaft 102, etc. are then compensated, improving controllability of the piston 110 during clutch engagement events.

The disconnect clutch assembly 100 also includes a clutch plate carrier 126 disposed axially between the backing plate 106 and the balance dam 112 and fixed to the backing plate 106, e.g., by a riveted connection. The disconnect clutch assembly 100 also includes a resilient element 128 disposed axially between the piston 110 and the balance dam 112 urging the piston 110 away from the balance dam 112. In the example embodiment shown, the resilient element 128 includes coil springs disposed about a circumference arranged radially inside of the clutch plates 108. Although coil springs are shown, other resilient elements are possible. For example, resilient element 128 may include a Belleville washer or a rubber puck.

The seal plate 114 is sealed to the shaft 102 at a seal 132. The seal plate 114 is sealed to the piston 110 at a bonded seal 130 to form a portion of the pressure chamber 124. The pressure chamber 124 is further defined by, or bounded between, the shaft 104, the seal 116, the piston 110, the bonded seal 130, the seal plate 114, and the seal 132. Hydraulic pressure in the pressure chamber 124 is increased to move the piston 110 towards clutch plates 108, pressing the clutch plates 108 against backing plate 106 to engage (or close) the disconnect clutch assembly 100. The shaft 102 may include a channel (not shown) in fluid communication with the pressure chamber 124 that adjusts a pressure in the pressure chamber 124.

The shaft 102 includes a first end 134 arranged adjacent to an engine (not shown) and a second end 138 arranged adjacent to a transmission (not shown). The shaft 102 may include a first channel 142 extending axially from the second end 138 towards the first end 134. For example, the first channel 142 may extend axially through the second end 138. That is, the first channel 142 may be open at the second end 138. In such an example, the first channel 142 must be sealed to direct fluid to apply the piston 110 or fill the balance chamber 122, e.g., preventing the fluid from flowing out of the second end 138 of the shaft 102.

The shaft 102 may further include a second channel 144 extending axially from the second end 138 towards the first end 134. The second channel 144 may extend axially through the second end 138. That is, the second channel 144 may be open at the second end 138. In such an example, the second channel 144 must be sealed similar to the first channel 142. The second channel 144 may be radially spaced from the first channel 142.

The cap 104 is connected to the shaft 102. The cap 104 may be formed of any suitable metal, e.g., steel. The cap 104 includes a base 146 and a wall 148 extending axially from the base 146. The base 146 extends circumferentially about the central axis A and is configured to cover the second end 138 of the shaft 102. The second end 138 of the shaft 102 may contact the base 146, e.g., to assist in positioning the cap 104 relative to the shaft 102.

The wall 148 extends annularly about the central axis A. An inner diameter of the wall 148 is configured to engage an outer diameter of the shaft 102. For example, the inner diameter of the wall 148 may be less than the outer diameter of the shaft 102. In such an example, the cap 104 may be connected to the shaft 102 via a press-fit connection. As another example, the inner diameter of the wall 148 may be equal to the outer diameter of the shaft 102. In such an example, the cap 104 may be connected to the shaft 102, e.g., by staking.

The wall 148 may be configured to axially constrain the seal plate 114. That is, the wall 148 may contact the seal plate 114 and prevent the seal plate 114 from moving axially towards the second end 138. The wall 148 may contact the seal plate 114 axially between the second end 138 and the seal 132. As one example, the wall 148 may directly contact the seal plate 114. As another example, the disconnect clutch assembly 100 may include a shim (not numbered) disposed axially between the wall 148 and the seal plate 114. The shim may contact the wall 148 and the seal plate 114. For example, the shim may be axially compressed by the wall 148 and the seal plate 114.

The cap 104 may further include a first plug 150 extending axially from the base 146. The first plug 150 is disposed radially inside of the wall 148. The first plug 150 extends in a same axial direction from the base 146 as the wall 148. The first plug 150 may be disposed in the first channel 142. That is, the first plug 150 may be designed, i.e., sized and shaped, to be received by the first channel 142. Specifically, the first plug 150 may be configured to seal the first channel 142. That is, the first plug 150 may engage the first channel 142 to prevent fluid from flowing out of second end 138 via the first channel 142. For example, a diameter of the first plug 150 may be greater than a diameter of the first channel 142. In such an example, the first plug 150 may be connected to the first channel 142 via a press-fit connection. A portion of the shaft 102 may be radially compressed between the first plug 150 and the wall 148, which can assist in retaining the cap 104 on the second end 138 of the shaft 102.

The cap 104 may further include a second plug 152 radially spaced from the first plug 150. Similar to the first plug 150, the second plug 152 may extend axially from the base 146 and be disposed radially inside of the wall 148. The second plug 152 may be disposed in the second channel 144. That is, the second plug 152 may be designed to be received by the second channel 144. Specifically, the second plug 152 may be configured to seal the second channel 144, similar to the first plug 150 being configured to seal the first channel 142. Another portion of the shaft 102 may be radially compressed between the second plug 152 and the wall 148, which can further assist in retaining the cap 104 on the second end 138 of the shaft 102.

The plugs 150, 152 may, for example, be integral with the base 146. Alternatively, the plugs 150, 152 may be formed separately from the base 146 and subsequently connected to the base 146, e.g., by welding, staking, etc.

Connecting the cap 104 to the second end 138 of the shaft 102 allows for distributing stress generated by the seal plate 114 contacting the wall 146 throughout the cap 104, which can decrease stress concentration at an interface between the cap 104 and the seal plate 114. Furthermore, embodiments disclosed herein provides plugs 150, 152 on the cap 104, to seal the corresponding channels 142, 144 in the shaft 102, which can reduce complexity of the disconnect clutch assembly 100 by removing a need for additional sealing components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS 100 disconnect clutch assembly
102 shaft
104 cap
106 backing plate
108 clutch plates
110 piston
112 balance dam
114 seal plate
116 seal
120 bonded seal
122 balance chamber
124 pressure chamber
126 clutch plate carrier
128 resilient element
130 bonded seal
132 seal
134 end
138 end
142 channel
144 channel
146 base
148 wall
150 plug
152 plug
A central axis

What is claimed is:

1. A clutch assembly, comprising:
   a shaft having a first end and a second end axially spaced from each other;
   a seal plate supported by the shaft; and
   a cap connected to the shaft and disposed at the second end, the cap including:
       a base covering the second end; and
       a wall extending from the base towards the first end, the wall being configured to axially constrain the seal plate;
   wherein the shaft includes a channel extending axially through the second end, the cap closing the channel at the second end.

2. The clutch assembly of claim 1, wherein the wall extends annularly about the shaft, the wall contacting the seal plate about the shaft.

3. The clutch assembly of claim 1, wherein the wall prevents movement of the seal plate towards the second end.

4. The clutch assembly of claim 1, wherein the wall contacts an outer diameter of the shaft.

5. The clutch assembly of claim 4, wherein the wall is connected to the shaft via a press-fit connection.

6. The clutch assembly of claim 1, wherein the second end of the shaft contacts the base.

7. The clutch assembly of claim 1, wherein the cap includes a plug disposed in the channel.

8. The clutch assembly of claim 7, wherein the plug is configured to seal the channel.

9. The clutch assembly of claim 8, wherein the plug is configured to prevent a flow of fluid out of the second end of the shaft.

10. The clutch assembly of claim 7, wherein the plug is connected to the channel via a press-fit connection.

11. The clutch assembly of claim 7, further comprising a seal configured to seal the seal plate to the shaft, the seal being disposed axially between the plug and the first end.

12. The clutch assembly of claim 7, wherein the plug is radially spaced from the wall.

13. The clutch assembly of claim 7, wherein the plug is disposed radially inside of the wall.

14. The clutch assembly of claim 7, wherein a portion of the shaft is radially compressed between the plug and the wall.

15. The clutch assembly of claim 1, wherein the channel is spaced from the first end.

16. The clutch assembly of claim 1, wherein the seal plate is disposed closer to the second end than to the first end.

17. The clutch assembly of claim 1, further comprising a seal configured to seal the seal plate to the shaft, the wall contacting the seal plate axially between the seal and the second end.

18. The clutch assembly of claim 1, further comprising a piston axially slidable along the shaft and sealed to the seal plate, the seal plate being disposed axially between the piston and the cap.

19. A clutch assembly, comprising:
   a shaft having a first end and a second end axially spaced from each other;
   a seal plate supported by the shaft; and
   a cap connected to the shaft and disposed at the second end, the cap including:
       a base covering the second end; and
       a wall extending from the base towards the first end, the wall being configured to axially constrain the seal plate;
   wherein the wall contacts an outer diameter of the shaft.

20. A clutch assembly, comprising:
   a shaft having a first end and a second end axially spaced from each other;
   a seal plate supported by the shaft;
   a cap connected to the shaft and disposed at the second end, the cap including:
       a base covering the second end; and
       a wall extending from the base towards the first end, the wall being configured to axially constrain the seal plate; and
   a piston axially slidable along the shaft and sealed to the seal plate, the seal plate being disposed axially between the piston and the cap.

* * * * *